Jan. 6, 1931. B. C. ROBBERSON 1,788,327
SIGNALING DEVICE
Filed March 12, 1930 2 Sheets-Sheet 1
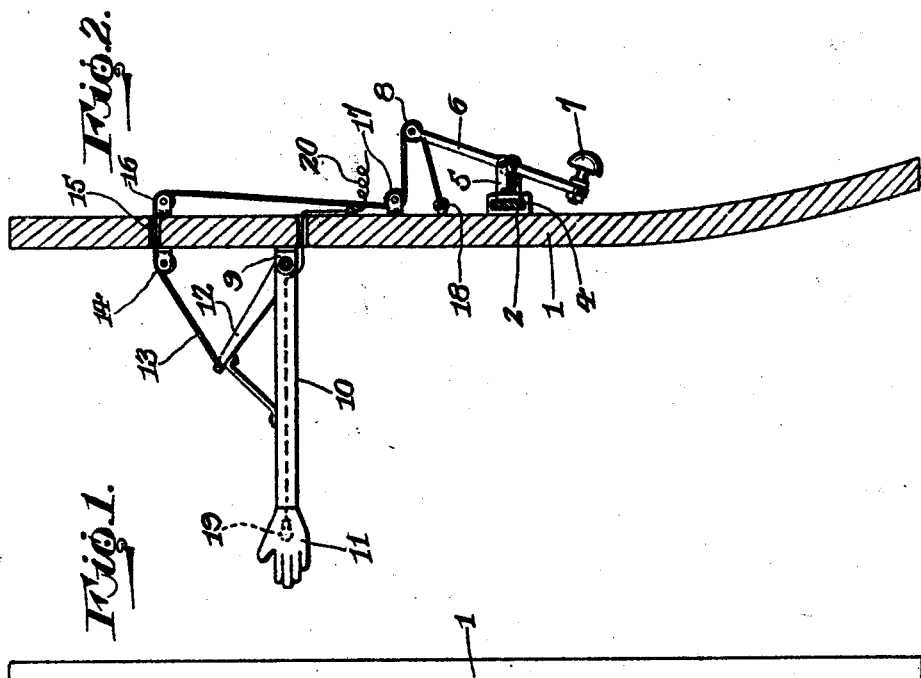
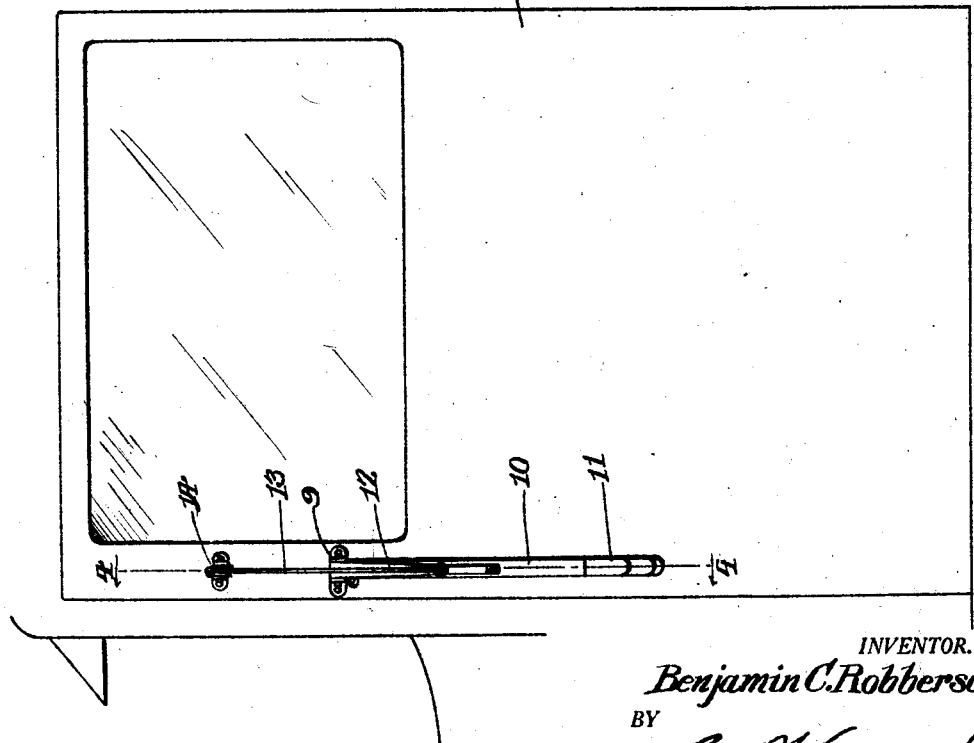
INVENTOR.
Benjamin C. Robberson,
BY
Geo. T. Kimmel
ATTORNEY.

Jan. 6, 1931.　　　B. C. ROBBERSON　　　1,788,327
SIGNALING DEVICE
Filed March 12, 1930　　2 Sheets-Sheet 2
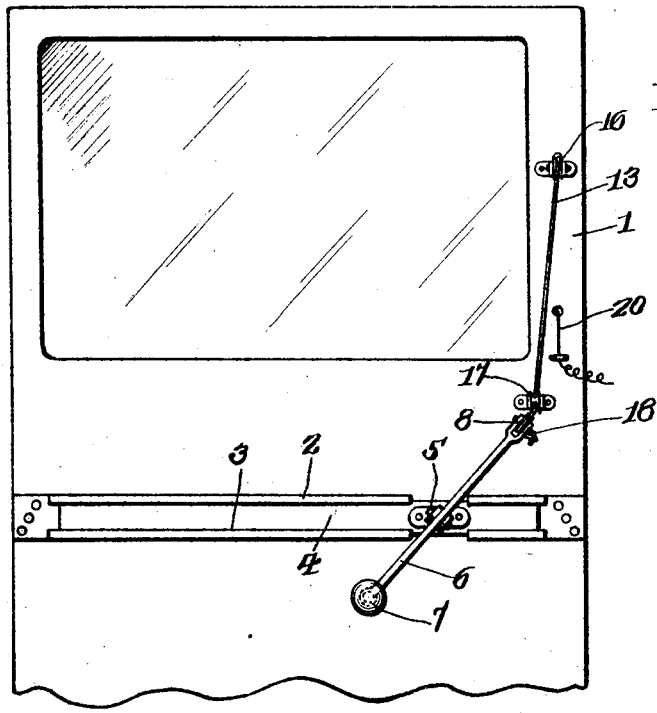
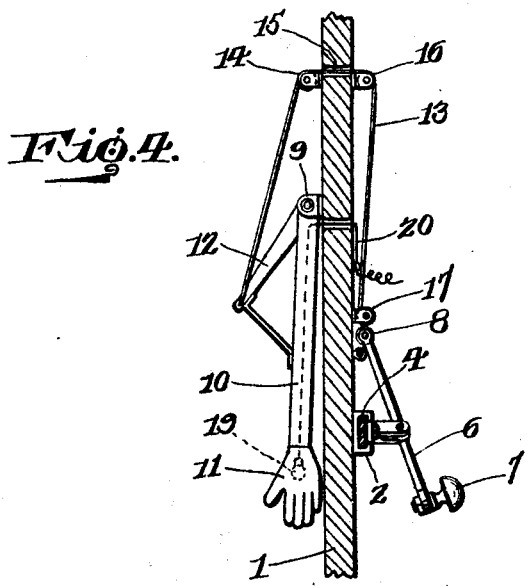
INVENTOR.
Benjamin C. Robberson
BY
Geo. P. Kimmel
ATTORNEY.

Patented Jan. 6, 1931

1,788,327

UNITED STATES PATENT OFFICE

BENJAMIN C. ROBBERSON, OF IMPERIAL, CALIFORNIA

SIGNALING DEVICE

Application filed March 12, 1930. Serial No. 435,269.

This invention relates to a signaling device adapted for use in connection with motor vehicles, and has for its primary object to provide, in a manner as hereinafter set forth, a device of such class which may be operated at the will of the operator of the vehicle without the necessity of the operator removing his hands from the steering wheel or his feet from the vicinity of the clutch and brake pedals, thereby providing a signaling device which may be operated with a maximum of safety and a minimum of effort.

A further object of the invention is to provide a signaling device having the foregoing characteristics, which includes an extensible signal arm which is in full view of the operator when in extended or signaling position, thereby apprising the operator of the position of the signal arm without necessitating the removal of the operator's gaze on the road ahead of the vehicle.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is an elevation of a signaling device in accordance with this invention, showing the same in association with a vehicle of the closed body type.

Figure 2 is a section taken at a point indicated by the line 4—4 of Figure 1, showing the signal arm in extended or signaling position.

Figure 3 is a view similar to Figure 1, showing the device from the opposite side of the door upon which it is mounted.

Figure 4 is a section taken on the line 4—4 of Figure 1.

By way of illustration, my improved signaling device is shown in connection with a vehicle of the closed body type, although it is to be understood that the device may also be used in connection with vehicles of the open body type. In the embodiment shown, the numeral 1 designates the front door of a vehicle body which is located adjacent the seat for the operator of the vehicle. Secured to the inner face of the door 1 is a transversely extending channel iron 2 which is formed in its outer face with a longitudinally extending slot 3. Adjustably mounted within the slot 3 is a bar 4 which is provided with a bifurcated lug 5 projecting through the slot 3 and having a lever 6 pivotally connected therewith, intermediate the ends of the lever. The lever 6 is disposed at a forward and upward inclination and terminates at its rearward end adjacent the natural position of the knee of the operator of the vehicle. The lever 6 is provided at its rearward end with a knob 7 for abutment by the knee of the operator, and is formed at its forward end with a bifurcation within which is rotatably mounted a pulley 8.

Projecting from the outer face of the door 1 is a bifurcated lug 9 to which is pivotally connected one end of an arm 10, the other end of which is provided with an element 11 simulating a human hand. Secured to the arm 10 is a bracket 10 to which is connected one end of a cord 13 which passes over a pulley 14 rotatably mounted above the lug 9, then through an opening 15 through the door 1, over a pulley 16 rotatably mounted on the inner face of the door 1, thence downwardly over a pulley 17 rotatably mounted on the inner face of the door, thence over the pulley 8 to an apertured lug 18 which is secured to the door 1, and to which the cord 13 is secured.

Preferably the hand 11 is of hollow construction and formed of a transparent or translucent material, and having disposed therein a light bulb 19 which is provided with a conductor 20 adapted to be connected with a source of electrical energy, not shown. If desired, the conductor 20 may be provided with a suitable switch, not shown, in order that the bulb 19 may be illuminated automatically upon the actuation of the signaling device to raise the arm 10 to signaling position.

When it is desired to signal with my improved signaling device, it is merely necessary for the operator of the vehicle to press his knee against the knob 7 of the lever 6 which causes the pulley 8 to exert a pull on the cord 13 whereby the arm 10 is raised to the horizontal position shown in Figure 2. Upon the release of the knob 7, the arm 10 will fall to non-signaling position as shown in Figure 4.

Preferably the cord 13 will be of appropriate length to permit the arm 10 to assume a position approximately 45° above horizontal when the lever 6 is swung to the limit of its operating movement.

It is thought that the many advantages of a signaling device in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a signaling device, a vehicle door formed with an opening extending therethrough, a signaling arm pivotally connected at one end with the outer face of the door, a supporting element projecting from the inner face of the door, a lever pivotally connected intermediate its ends to said supporting element, a flexible element passing through said opening and having its respective ends secured to the inner face of said door and said signaling arm, and a pulley rotatably mounted on one end of said lever and having said flexible element passing thereover.

2. In a signaling device, a vehicle door formed with an opening extending therethrough, a signaling arm pivotally connected at one end with the outer face of the door, a supporting element projecting from the inner face of the door, a lever pivotally connected intermediate its ends to said supporting element, a flexible element passing through said opening and having its respective ends secured to the inner face of said door and said signaling arm, and a pulley rotatably mounted on one end of said lever and having said flexible element passing thereover, said lever extending at a forward and upward inclination and having the other end thereof terminating adjacent the natural position of the knee of the operator of the vehicle.

3. In a signaling device, a vehicle door formed with an opening extending therethrough, a signaling arm having one end pivotally connected with the outer face of the door, a supporting element adjustably mounted on the inner face of the door, a lever pivotally connected intermediate its ends to said supporting element, a pulley rotatably mounted on the outer face of the door, a pair of pulleys rotatably mounted on the inner face of the door, a flexible element connected at one end with said signaling arm, said flexible element extending through said opening and passing over said pulleys and connected at its opposite end to the inner face of the door, and a pulley rotatably mounted on one end of said lever and having said flexible element passing thereover, said lever extending at a forward and upward inclination and terminating at its opposite end adjacent the natural position of the knee of the operator of the vehicle.

4. In a signaling device, a pivotally mounted signaling arm, a support therefor, a lever pivotally connected intermediate its ends with the support, and a flexible element having its respective ends connected to the signaling arm and support, said flexible element being slidably connected with one end of said lever.

In testimony whereof, I affix my signature hereto.

BENJAMIN C. ROBBERSON.